United States Defensive Publication [19] (H) [11] T980,001

Minnick et al. [43] Mar. 6, 1979

[54] UV VIEWING THROUGH SODIUM COOLANT

[75] Inventors: Lawrence E. Minnick, Los Altos Hills; Randall W. Pack, Redwood City, both of Calif.

[73] Assignee: Electric Power Research Institute, Palo Alto, Calif.

[21] Appl. No.: 811,012

[22] Filed: Jun. 29, 1977

Related U.S. Application Data

[63] Continuation of Ser. No. 668,160, Mar. 18, 1976, abandoned.

[51] Int. Cl.[2] ..... G21C 17/00

[52] U.S. Cl. ..... 176/19 R

[57] ABSTRACT

Sodium-immersed components in a nuclear reactor are rendered observable by illumination with radiation in the ultraviolet (UV) sprectrum and by detecting reflected radiation through a UV scanning means, such as a television type camera sensitive to UV radiation. The UV scanning means may be adapted to be immersed in molten sodium coolant to facilitate observation of selected locations within the nuclear reactor. Real-time images may be provided for monitoring reactor operation and remotely-controlled reactor maintenance operations.

1 Claim, 1 Sheet Drawing,

9 Pages Specification

The file of this unexamined application may be inspected and copies thereof may be purchased (849 O.G. 1221, Apr. 9, 1968).

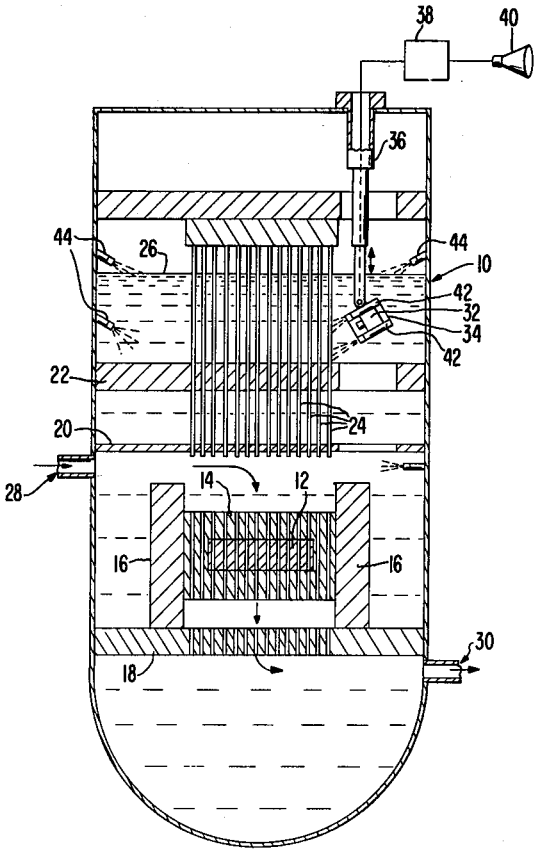

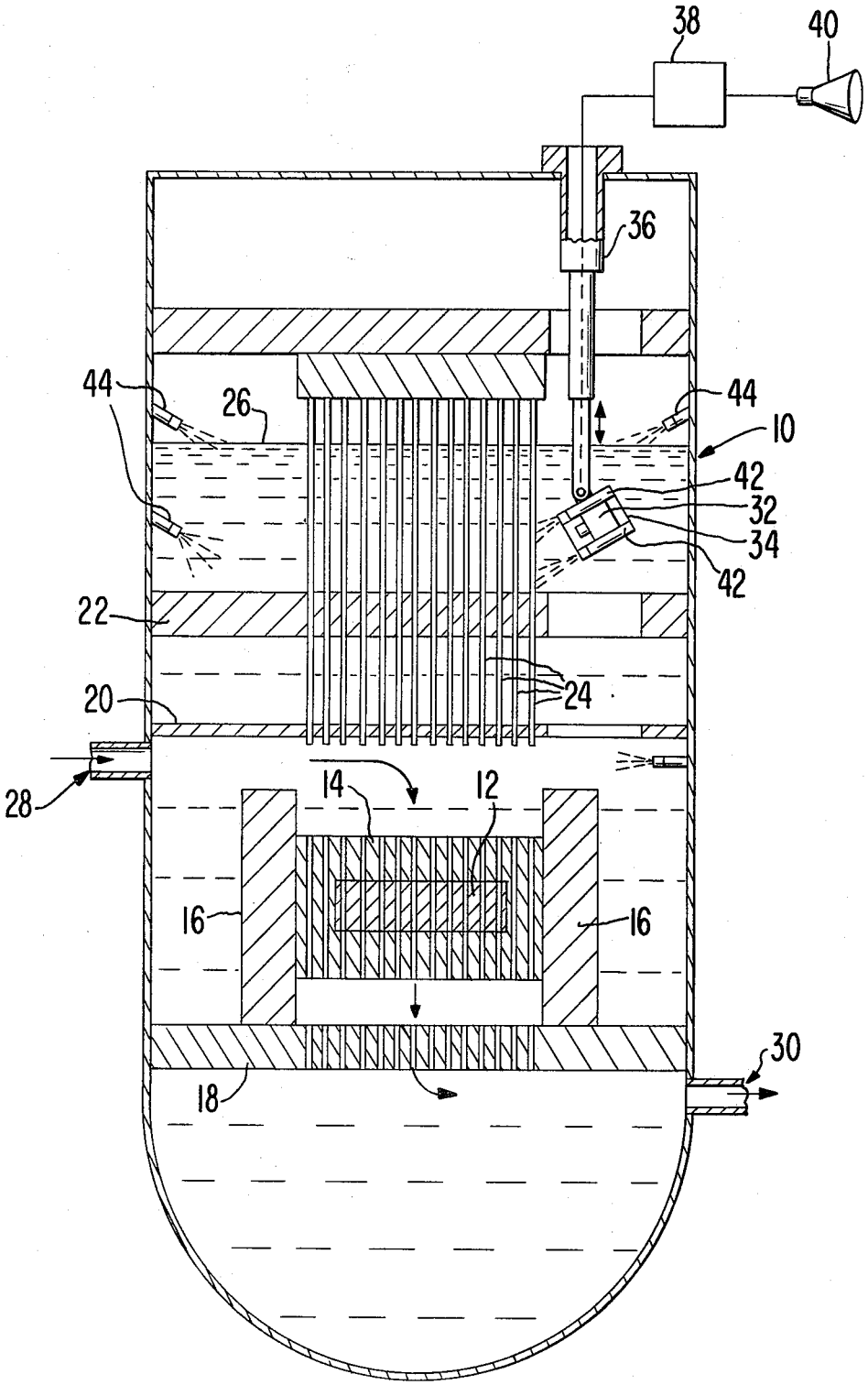
38
40
36
44
26
44
10
42
32
34
42
22
24
20
28
14
12
16
16
30
18